March 21, 1950 W. J. ZENNER 2,501,118

ARRANGEMENT FOR INTRODUCING ELECTRICAL BIAS

Filed March 28, 1947

INVENTOR

WALTER J. ZENNER

BY Emery Robinson

ATTORNEY

Patented Mar. 21, 1950 2,501,118

UNITED STATES PATENT OFFICE 2,501,118

ARRANGEMENT FOR INTRODUCING ELECTRICAL BIAS

Walter J. Zenner, Des Plaines, Ill., assignor to Teletype Corporation, Chicago, Ill., a corporation of Delaware Application March 28, 1947, Serial No. 737,946

1 Claim. (Cl. 178—69)

This invention pertains to telegraph systems, and relates more particularly to improvements in telegraph systems wherein transmission is limited to one direction or the other at a time.

Heretofore, in such telegraph systems the line relays or line magnets were of the type which is responsive to the presence or absence of line current irrespective of the direction thereof. Systems of this character are troublesome due to leakage and capacity. Especially is this true in portable field printer systems having field lines up to twenty-five miles in length wherein line relays are not employed. Such lines are usually laid directly on the ground, and as a result, the leakage currents and the capacitance to ground are much greater than encountered in normal telegraph printers. This condition causes high spacing currents, so that the selector does not properly interpret a spacing signal.

It is, therefore, a primary object of the invention to provide a means associated with the transmitting means for controlling the line magnet biasing means according to the direction of transmission.

Specifically, in achieving the object of the present invention one coil of the selector magnet is connected to the signal line, and the other coil is connected to a local source of direct current, preferably through a suitable rheostat so that the current may be varied. The direction of the current in this local circuit (biasing current) is such as to produce a flux opposing that produced by the signaling and leakage currents. By balancing the bias current against the leakage current, the signal received from a distant transmitter over this kind of line may be properly interpreted by the selector. However, when the local station is transmitting, it is necessary to remove this biasing current so that the local selector may properly interpret the signal, inasmuch as the leakage current locally is zero. This result, according to the present invention, is achieved by adding a contact together with a controlling cam therefor to the transmitter assembly. This contact will be closed when the transmitter cam is in its "stop" position, and thus will complete the local biasing circuit when transmission is from the distant apparatus. When the transmitter cam leaves its "stop" position, the contact will open so as to remove the biasing current during transmission from the local keyboard.

Figure 1:
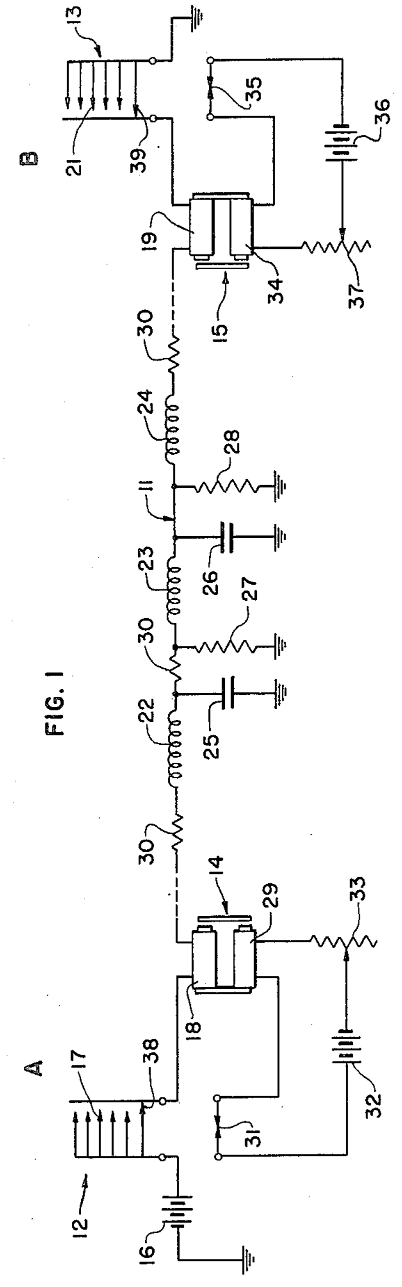
Figure 2:
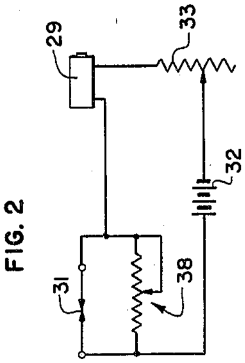

A better understanding of the objects and features of the present invention may be had from the following description when taken in conjunction with the accompanying drawing, wherein:

Fig. 1 is a diagrammatic view of the circuit according to the present invention; and Fig. 2 is an alternate view of the biasing circuit control contact arrangement.

In this view a telegraph line or signal line 11 is shown extending between stations A and B which are provided with similar apparatus. The keyboard transmitters 12 and 13 are indicated diagrammatically and are of the type disclosed in U. S. Patent No. 1,595,472 granted August 10, 1926, to H. L. Krum. The line magnets, indicated generally as 14 and 15, are of the holding type disclosed in U. S. Patent No. 1,917,308 issued to H. L. Krum, or U. S. Patent No. 1,937,376 issued to W. J. Zenner. The line circuit extends from grounded battery 16 at station A, through closed ones of the transmitting contacts 17 of transmitter 12, through winding 18 of line magnet 14, over the signal line 11, through the winding 19 of line magnet 15, through closed ones of the transmitting contacts 21 of transmitter 13, thence to ground. As is well known in the art, battery may be supplied at both stations, being, of course, so arranged as not to oppose each other.

As previously mentioned, the signal line, as contemplated by the present invention is usually laid directly on the ground resulting in leakage currents and capacitance to ground greater than encountered in normal telegraph circuits. Accordingly, this condition is schematically illustrated by inductances 22, 23, and 24, condensers 25 and 26, and resistances 27, 28, and 30.

At station A, the second winding 29 of the selector magnet 14 is included in a normally closed biasing circuit comprising a contact 31 controlled by a cam (not shown) carried on the transmitter cam shaft, battery 32, and rheostat 33. Similarly, the second winding 34 of selector magnet 15 is included in a biasing circuit comprising cam controlled contact 35, battery 36, and rheostat 37. Thus, when neither station is transmitting, start-stop contacts 38 and 39 of keyboard transmitters 12 and 13, respectively, are closed and marking current is applied to the signal line. In this condition of the system, contacts 31 and 35 are also closed. When station A is sending, the contacts 17 and 38 are opened cyclically and sequentially, in well known manner. Also, contact 31 is opened and closed with contact 38, so that during transmission from station A, contact 31 is opened cyclically, and is open during the transmission of the significant code impulses. In like manner, the contacts 35 and 39 are operable cyclically so that they remain open during the periods of transmission from station B.

In the operation of the system according to the present invention, the signal line 11, in accordance with general practice, is normally impressed with marking current of the strength of substantially 60 milliamperes and the signaling conditions are of the current and no current type. The values given herein are only by way of example, and it is understood that these values will vary under changing line conditions. Therefore, rheostats 33 and 37 are provided at stations A and B, respectively, for adjusting the biasing circuit to compensate for varying line conditions. Under the condition shown, with the signal line 11 closed, 60 milliamperes current flows upon the line supplied by battery 16 at station A. Thus 60 milliamperes is applied to the winding 18 of magnet 14 to operate this magnet. However, since substantially 20 milliamperes is lost due to leakage, only 40 milliamperes is impressed on the winding 19 of magnet 15, which is deemed more than sufficient to operate the selector mechanism of which magnet 15 is a part. Now, when the signal line is opened due to a spacing signal being transmitted from station A, the current strength at station A will drop to zero and no current will flow through the winding 18 of magnet 14. However, due to the discharge of current from the condenser simulated by the signal line resting on the ground, the current through the winding 19 of magnet 15 will not immediately fall to zero.

In the practice of the present invention, neutral magnet selector mechanisms of the holding magnet type are employed, such as disclosed in the afore-mentioned Krum Patent 1,917,308 and Zenner Patent 1,937,376, wherein is employed the principle that the amount of current which an electromagnet requires to hold its armature in attracted position is a small fraction of the amount of current the electromagnet required to attract its armature from a distance. In this type of selector a means is provided which is entirely independent of the electromagnet for moving the armature into engagement or near engagement with the core of the electromagnet. Selectors of this type are also known as selectors of the assisted armature type.

Thus, in the transition from marking to spacing under the control of transmission from station A (that is, station A sending and station B receiving), the current through the winding 19 of magnet 15 did not drop to zero soon enough to permit the armature thereof to release, but instead the current strength dropped to an amount which was sufficient to hold the armature attracted. Therefore, to insure the proper response of the armature of magnet 15 to marking and spacing signal impulses, the biasing circuit comprising battery 36, rheostat 37, winding 34 of magnet 15 and cam controlled contact 35 is provided, which, when closed during transmission from station A to station B, will neutralize the spacing current effect through winding 19 to zero. Even though the marking current through winding 19 under this condition of operation is 40 milliamperes, the resultant effect of the biasing current of 20 milliamperes thereon will, as previously mentioned, still be sufficient to hold the armature attracted under marking conditions.

On the other hand, because of the cyclical opening of contact 31 during transmission, in such manner that contact 31 will always be open when code signal impulses are sent from station A, no neutralizing effect will be applied by coil 29, and accordingly the current through winding 18 of magnet 14 will range from 60 milliamperes for marking to zero for spacing. However, during the stop interval, the biasing circuit at station A will reduce the effective flux in magnet 14, but not below a value required to hold the armature attracted.

Assuming now that transmission is taking place from station B to station A. The start-stop contact 39, selected transmitting contacts 21 and the contact 35 of the biasing circuit at station B are opened and closed cyclically, the contacts 35 and 39 opening simultaneously. During marking conditions of the line, current of 60 milliamperes will be impressed on windings 18 of magnet 14, and 40 milliamperes will be impressed on winding 19 of magnet 15 due to leakage, as previously described. However, as described in connection with transmission from station A. the biasing circuits at stations A and B will, during the stop interval reduce the effective flux in magnets 14 and 15, but not below a value sufficient to hold the armatures thereat attracted. Now. during transmission from station B the marking current on winding 19 will be 40 milliamperes and the spacing current will be zero, since the current due to capacitance will not discharge through winding 19 (since the transmitting contacts of station B are open at this time). However, during the spacing intervals, the contact 38 at station A is still closed, and due to leakage the current through winding 18 will not fall to zero. In addition, due to the capacity effect previously described, the current decay through winding 18 will be retarded and accordingly the biasing circuit at station A will be adjusted to a higher value than as previously described for station B to compensate for the combined effect of leakage and capacitance.

It is sometimes desirable to operate the signal line under the conditions wherein the current in the signal line will not become zero but instead some value above zero. In Fig. 2 is shown a biasing control circuit wherein the contacts 31 and 35 are shunted by a rheostat 38. Thus, when contacts 31, for example, are open, the value of the biasing current may be maintained at a predetermined value above zero, instead of falling to zero.

It is thus seen that by balancing the biasing current against the current effect due to leakage and/or distortion, the signal received from a distant transmitter over a line having excessive distortion and leakage may be properly interpreted by the selector. The desired result may be achieved according to the present invention by providing a contact and controlling cam therefor in the transmitter assembly and a biasing circuit in neutral magnet selector mechanism of the holding magnet type.

Although only one form and arrangement of apparatus and circuits embodying the invention is shown and described herein, it is readily understood that various changes and modifications may be made therein within the scope of the following claim without departing from the spirit and scope of the invention.

What is claimed is:

In a single current telegraph system, an insulated signal line having a source of current only at one end thereof, said signal line normally having direct contact with the ground thereby simulating a condenser, a neutral holding magnet selector mechanism responsive to marking and spacing signal conditions of current and no current, respectively, one such magnet selector connected in said line at each end thereof, and biasing means comprising a local biasing winding associated with each magnet, the individual energizing circuits for said biasing windings being entirely independent of said signal line, said individual energizing circuits each including a cam operated contact operative to open said circuit only during transmission periods, whereby said biasing means at the receiving station is effective during spacing intervals to balance the biasing current against the condenser discharge current to enable proper interpretation by said selectors of the signal condition impressed on the signal line.

WALTER J. ZENNER.

REFERENCES CITED

The following references are of record in the file of this patent:

UNITED STATES PATENTS

| Number | Name | Date |
|---|---|---|
| 2,047,091 | Amann | July 7, 1936 |
| 2,216,820 | Lewis | Oct. 8, 1940 |